(12) United States Patent
Tomioka et al.

(10) Patent No.: US 7,538,789 B2
(45) Date of Patent: May 26, 2009

(54) OPTICAL SCANNING DEVICE AND IMAGE FORMING APPARATUS USING THE SAME

(75) Inventors: Yuichi Tomioka, Utsunomiya (JP); Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/965,229

(22) Filed: Dec. 27, 2007

(65) Prior Publication Data

US 2008/0165244 A1 Jul. 10, 2008

(30) Foreign Application Priority Data

Jan. 6, 2007 (JP) .............................. 2007-000870

(51) Int. Cl.
B41J 15/14 (2006.01)
B41J 27/00 (2006.01)
H04N 1/04 (2006.01)

(52) U.S. Cl. .................. 347/243; 347/259; 358/481

(58) Field of Classification Search ......... 347/241–244, 347/256–261; 358/481; 359/204, 205, 215–217
See application file for complete search history.

(56) References Cited

U.S. PATENT DOCUMENTS

| 5,245,462 | A | * | 9/1993 | Kanai et al. | ............... 359/204 |
| 5,701,190 | A | * | 12/1997 | Mochizuki et al. | .......... 359/205 |
| 6,937,376 | B2 | * | 8/2005 | Takakubo | ................... 359/216 |
| 7,268,948 | B2 | | 9/2007 | Matsuo et al. | ............. 359/575 |
| 7,391,542 | B2 | * | 6/2008 | Tanimura et al. | ............ 358/481 |
| 2001/0026391 | A1 | | 10/2001 | Ishibe | ........................ 359/196 |
| 2004/0246535 | A1 | | 12/2004 | Takizawa | ................... 358/474 |

FOREIGN PATENT DOCUMENTS

| EP | 1 197 780 A2 | 4/2002 |
| EP | 1 603 321 A2 | 12/2005 |
| JP | 2004-184591 | 7/2004 |

OTHER PUBLICATIONS

Apr. 10, 2008 Communication in European Patent Appln. No. 08000026.

* cited by examiner

*Primary Examiner*—Hai C Pham
(74) *Attorney, Agent, or Firm*—Fitzpatrick, Cella, Harper & Scinto

(57) ABSTRACT

An optical scanning device includes a rotary polygonal mirror for scanningly deflecting light beams emitted from a light source device having light emitting members disposed spaced apart from each other in a main-scan direction. The optical scanning device further includes an input optical system by which, in a sub-scan section, light beams are incident on a deflecting surface of the rotary polygonal mirror in an oblique direction with respect to a normal to the deflecting surface, and an imaging optical system by which the light beams scanningly deflected by the rotary polygonal mirror are imaged on a surface to be scanned.

7 Claims, 9 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is effectively applicable to an image forming apparatus such as a laser beam printer or a digital copying machine having an electrophotographic process or a multi-function printer, for example.

In optical scanning devices, a light flux (light beam) which is optically modulated by a light source device in accordance with an imagewise signal and which emerges therefrom is periodically deflected by deflecting means (optical deflector) that comprises a polygonal mirror, for example. The light beam deflected by the optical deflector is then collected into a spot-like shape upon the surface of a photosensitive recording medium, through an imaging optical system having an f-θ characteristic. With this light beam, the recording medium surface is optically scanned, by which image recording is carried out thereon.

Recently, in image forming apparatuses such as laser printers, digital copying machines and multi-function printers, for example, the machine size has decreased on one hand and the speed of image formation has increased on the other hand. Thus, it has been desired to make the optical scanning system more compact and with a simpler structure.

Several proposals have already been made in regard to an optical scanning device in which compactification and reduction in size of the whole system are attempted (see patent document No. 1 below).

In patent document No. 1, a plurality of light beams emitted from a light source device are incident on the same deflecting surface of the same deflecting means (rotary polygonal mirror) from obliquely above or obliquely below within a sub-scan section, with respect to a normal to the deflecting surface (oblique incidence optical system).

Then, the light beams scanningly deflected by the same deflecting surface are directed to a plurality of corresponding photosensitive drum surfaces by an imaging optical system, while the light path is divided by light beam separating means.

Subsequently, by driving the deflecting means, the photosensitive drum surfaces are optically scanned with the light beams directed thereto.

In patent document No. 1, by setting the components in this manner, several parts of the deflecting means and the imaging optical system are shared, by which compactification and reduction in size of the overall system is attempted.

In this type of optical scanning devices, for higher printing speed, a multiple-beam light source having a plurality of light emitting members (light emission points) may be used in each light source device, to ensure that the same photosensitive drum (scanned surface) is optically and simultaneously scanned with a plurality of lines which are spaced from each other in the sub-scan direction.

On the other hand, since the process speed has to be improved to attain higher printing speed, the power of the laser source is likely short.

In consideration of this, in optical scanning devices using a multiple-beam light source, for higher optical efficiency, the multiple-beam light source may be disposed so that a plurality of light emitting members thereof are spaced apart from each other in the main-scan direction, based on the relationship of the far field pattern.

[Patent Document]
No. 1: Japanese Laid-Open Patent Application No. 2004-184591

However, if a multiple-beam light source is incorporated into an optical scanning device which comprises an oblique incidence optical system, it causes an inconvenience that, with respect to individual image heights, there will be produced unevenness of line spacings of plural light beams. This obstructs good image formation.

Hereinafter, such unevenness will be referred to as "multiple-beam pitch unevenness".

The principle of multiple-beam pitch unevenness which occurs in an optical scanning device having a multiple-beam light source including a plurality of light emitting members spaced apart from each other in the main-scan direction and having an oblique incidence optical system, will be explained below.

When, in the main-scan section, two divergent light beams emitted from two light emitting members which are spaced from each other by a (mm) in the main-scan direction are converted into parallel light by means of one and the same collimator lens, since each light emitting member has a certain field angle with respect to the optical axis of the collimator lens, the two light beams coming out of the collimator lens will have an angular difference σ [deg] in dependence upon the focal length fcol [mm] of the collimator lens.

Here, the angular difference σ [deg] is given by the following equation.

$$\sigma = 2\,\mathrm{Arctan}(a/2fcol)\,[\deg] \qquad (A)$$

FIG. 11 is a schematic diagram which explains the principle of the multiple-beam pitch unevenness which occurs when light beams A and B emitted from two light emitting members 1a1 and 1a2 have an angular difference σ in the main-scan section.

In FIG. 11, two light beams (light fluxes) having an angular difference σ in the main-scan direction are depicted as a beam A and beam B. When these two beams A and B are incident on a rotary polygonal mirror, in order that the two beams A and B arrives at the same image height, the pivot angle θ of the rotary polygonal mirror for scanningly deflecting the beam B should have a deviation of very small angle σ/2 relative to the pivot angle θ of the rotary polygonal mirror for scanningly deflecting the beam A.

Here, in FIG. 11, the position of the deflecting surface of the rotary polygonal mirror for scanningly deflecting the beam A is depicted by M (solid line), while the position of the deflecting surface of the rotary polygonal mirror when the rotary polygonal mirror is tilted by a minute angle σ/2 is depicted by M' (dotted line).

Hence, in the main-scan section, the deflection point Q' of the beam B deviates by dX [mm] relative to the deflection point Q of the beam A.

When in the main-scan section the deflection point deviates by a deviation amount dX [mm], if the light beam is being incident in the sub-scan section (sub-scan direction) at an oblique incidence angle α ([deg], then the deflection point Q' of the beam B will shift in the sub-scan direction by ΔdZ relative to the deflection point Q of the beam A, wherein ΔdZ represents the amount of deviation and is given by $$\Delta dZ = dX * \tan(\alpha)$$

Here, if the imaging magnification (sub-scan magnification) of the imaging optical system in the sub-scan direction is denoted by $\beta s$, then, on the scanned surface and at individual image heights, there occurs a deviation of the spacing of two beams in the sub-scan direction by a deviation amount ΔdZ' which is given by $$\Delta dZ' = \Delta dZ * \beta s$$

as compared with the case wherein there is no angular difference α of the light beams in the main-scan direction.

Since the deviation amount ΔdZ varies from one image height to another (image height within the effective scan field angle), the deviation amount ΔdZ' also changes depending on it. As a result, multiple-beam pitch unevenness occurs on the scanned surface.

Conventional optical scanning devices as described above have no measures for this multiple-beam pitch unevenness and, if a multiple-beam system is incorporated, large multiple-beam pitch unevenness will be produced. This inconveniently obstructs good image formation.

From the principle of multiple-beam pitch unevenness ΔdZ' described above, it is seen that the pitch unevenness can be reduced by lowering the oblique incidence angle α, effective scan field angle (pivot angle of rotary polygonal mirror) θ, and sub-scan magnification βs. However, there is a certain limit, from the design, to make smaller the values of oblique incidence angle α and sub-scan magnification βs. Thus, by making only one of them small, it is still impracticable to lower the multiple-beam pitch unevenness to an acceptable level.

SUMMARY OF THE INVENTION

The present invention provides an optical scanning device which is compact and assures higher printing speed and better optical performance. The present invention also provides an image forming apparatus having such optical scanning device.

In accordance with an aspect of the present invention, there is provided an optical scanning device, comprising: a light source device having at least two light emitting members disposed spaced apart from each other in a main-scan direction; a rotary polygonal mirror configured to scanningly deflect at least two light beams emitted from said light source device; an input optical system configured to project the at least two light beams from said light source device onto said rotary polygonal mirror so that, within a sub-scan section, the at least two light beams are incident on a deflecting surface of said rotary polygonal mirror in an oblique direction with respect to a normal to the deflecting surface; and an imaging optical system configured to image, upon a surface to be scanned, the at least two light beams scanningly deflected by the deflecting surface of said rotary polygonal mirror; wherein said input optical system includes a converting optical element configured to transform a light beam from said light source device into a parallel light beam, and wherein, when a maximum pivot angle of said rotary polygonal mirror for scanning an effective region on the scanned surface is denoted by $\theta_{max}$ [deg], an angle defined in the main-scan section between an optical axis of said input optical system and an optical axis of said imaging optical system is denoted by 2ø [deg], a focal length of said converting optical element in the main-scan section is denoted by fcol [mm], a spacing between two light emitting members, of the at least two light emitting members, which are most spaced apart from each other in the main-scan direction is denoted by a [mm], a largest one of oblique incidence angles in the sub-scan section of the at least two light beams incident on the deflecting surface of said rotary polygonal mirror is denoted by α [deg], an imaging magnification of said imaging optical system in the sub-scan section is denoted by βs, an inscribed-circle radius of said rotary polygonal mirror is denoted by R [mm], and a resolution of an image in the sub-scan direction is denoted by DPI [dot/inch], a relation $$\left| \frac{\tan\theta_{max}}{\cos\phi} \times \frac{a}{fcol} \times R \times \beta s \times \tan\alpha \times \frac{DPI}{25.4} \right| \leq |0.05|$$

is satisfied.

In one preferred form of this aspect of the present invention, the maximum pivot angle $\theta_{max}$ [deg] of said rotary polygonal mirror for scanning the effective region on the scanned surface may satisfy a relation 15 deg.<$\theta_{max}$<25 deg.

The largest angle α ([deg] of the oblique incidence angles in the sub-scan section of the at least two light beams incident on the deflecting surface of said rotary polygonal mirror satisfies a relation 2 deg.≦α≦4 deg.

The focal length fcol [mm] of said converting optical element in the main-scan section satisfies a relation 15 mm<fcol<80 mm.

The angle 2ø [deg] defined in the main-scan section between the optical axis of said input optical system and the optical axis of said imaging optical system satisfies a relation 0 deg.≦2ø≦100 deg.

The optical scanning device may satisfy a relation 0<a/fcol<0.02

The imaging magnification βs of said imaging optical system in the sub-scan section may satisfy a relation 0.5<|βs|<2.0

In accordance with another aspect of the present invention, there is provided an image forming apparatus, comprising: an optical scanning device as recited above; a photosensitive member disposed at a surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a further aspect of the present invention, there is provided an optical scanning device, comprising: an input optical system having at least two input units each including (i) a light source device having at least two light emitting members disposed spaced apart from each other in a main-scan direction, (ii) a rotary polygonal mirror configured to scanningly deflect at least two light beams emitted from said light source device, and a (iii) converting optical element configured to change a state of a light beam from said light source device, wherein said input optical system is configured to project at least two light beams from said at least two input units onto said rotary polygonal mirror so that, within a sub-scan section, the at least two light beams are incident on a deflecting surface of said rotary polygonal mirror in an oblique direction with respect to a normal to the deflecting surface; and an imaging optical system configured to image, upon a surface to be scanned, the at least two light beams scanningly deflected by the deflecting surface of said rotary polygonal mirror; wherein, when a maximum pivot angle of said rotary polygonal mirror for scanning an effective region on the scanned surface is denoted by $\theta_{max}$ [deg], an angle defined in the main-scan section between an optical axis of said input optical system and an optical axis of said imaging optical system is denoted by 2ø [deg], an angular difference defined in the main-scan section between two light beams, of the at least two light beams incident on the deflecting surface of said rotary polygonal mirror, which two light beams have a largest angular difference, is denoted by σ [deg], a largest one of oblique incidence angles in the sub-scan section of the at least two light beams incident on the deflecting surface of said rotary polygonal mirror is denoted by α [deg], an imaging magnification of said imaging optical system in the sub-scan section is denoted by βs, an inscribed-circle radius of said rotary polygonal mirror is denoted by R [mm], and a resolution of an image in the sub-scan direction is denoted by DPI [dot/inch], a relation $$\left| \frac{\tan\theta_{max}}{\cos\phi} \times \tan\left(\frac{\sigma}{2}\right) \times R \times \beta s \times \tan\alpha \times \frac{DPI}{25.4} \right| \leq |0.05|$$

is satisfied.

In one preferred form of this aspect of the present invention, the maximum pivot angle $\theta_{max}$ [deg] of said rotary polygonal mirror for scanning the effective region on the scanned surface satisfies a relation 15 deg.$<\theta_{max}<$25 deg.

The largest angle α ([deg] of the oblique incidence angles in the sub-scan section of the at least two light beams incident on the deflecting surface of said rotary polygonal mirror may satisfy a relation 2 deg.$\leq\alpha\leq$4 deg.

The angular difference σ [deg] in the main-scan section of the two light beams of the at least two light beams incident on the deflecting surface of said rotary polygonal mirror, which two light beams have a largest angular difference, may satisfy a relation 0 deg.$<\sigma<$1.0 deg.

The angle 2ø [deg] defined in the main-scan section between the optical axis of said input optical system and the optical axis of said imaging optical system may satisfy a relation 0 deg.$\leq 2\varnothing \leq$100 deg.

The imaging magnification βs of said imaging optical system in the sub-scan section may satisfy a relation 0.5<|βs|<2.0.

In accordance with the present invention, an optical scanning device and an image forming apparatus using the same, by which high-speed printing and good optical performance are assured with a compact structure, are accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
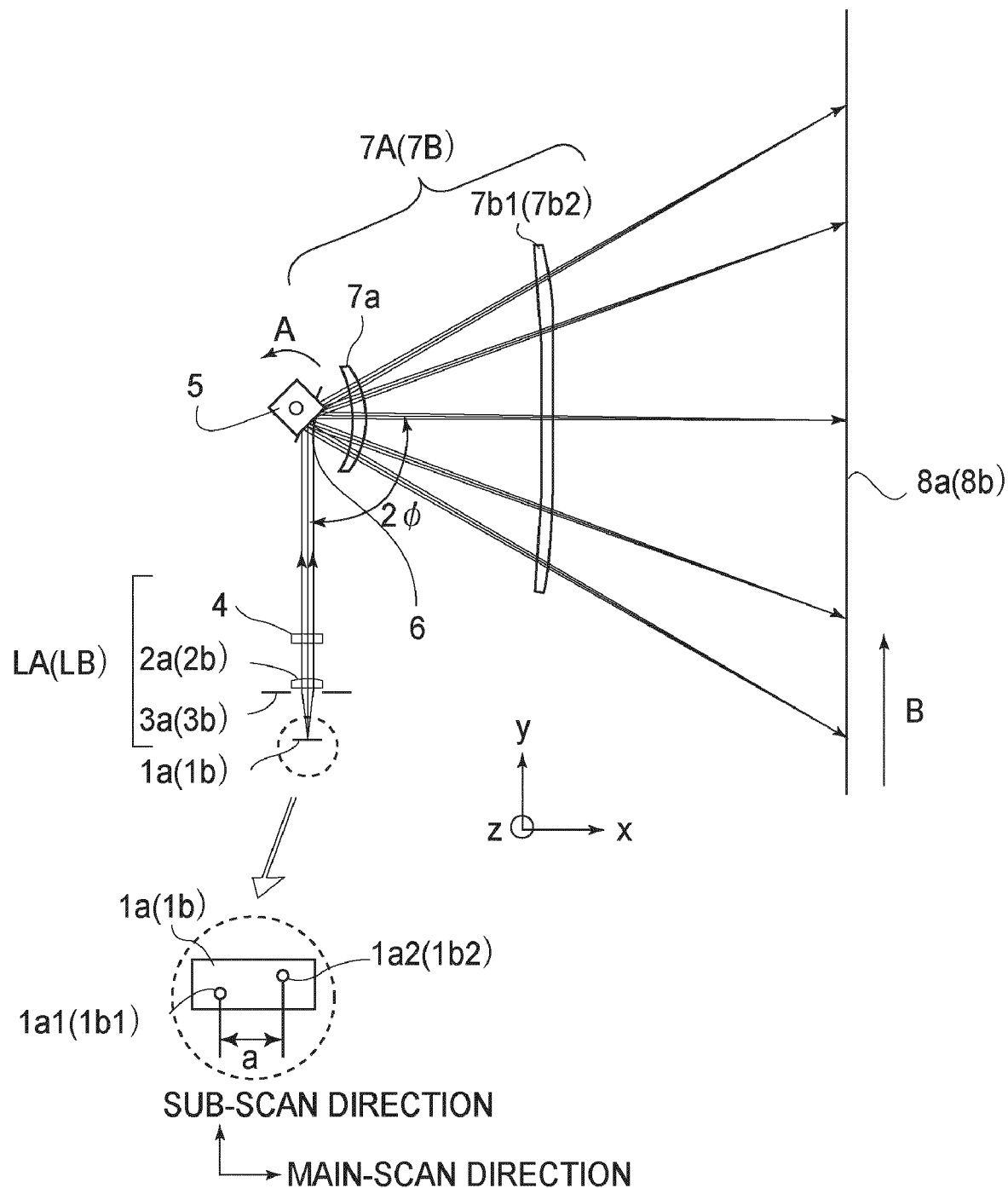
FIG. 1 is a sectional view along a main-scan section, of a first embodiment of the present invention.

FIG. 1 is a sectional view along a main-scan direction (main-scan sectional plane) of a main portion of a first embodiment of the present invention.

Figure 2A:
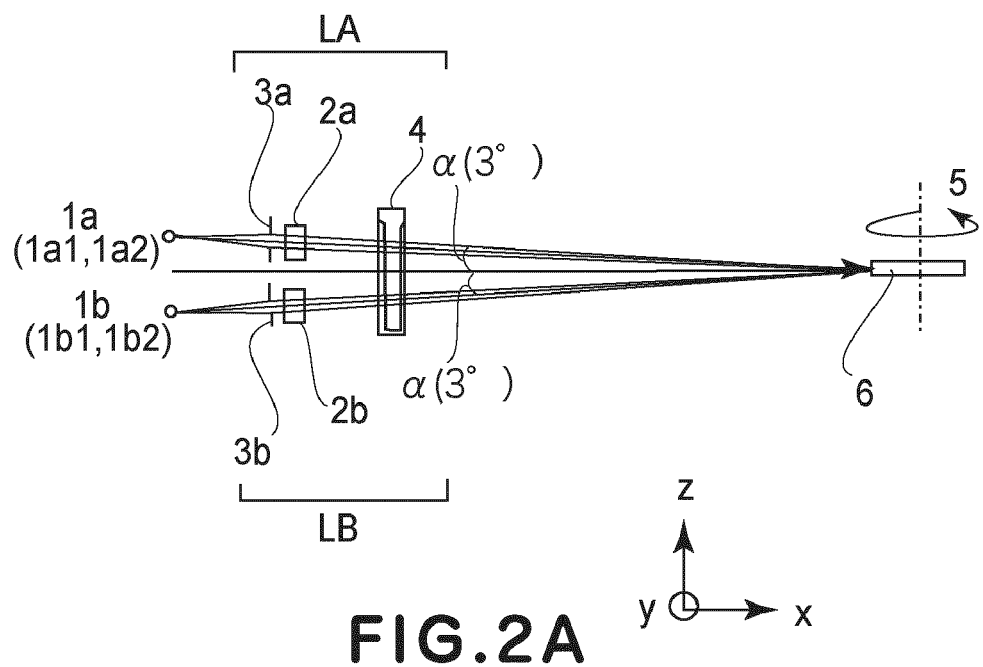
FIG. 2A is a sectional view along a sub-scan section, of an input optical system in the first embodiment of the present invention.

FIG. 2A is a sectional view along a sub-scan direction (sub-scan sectional plane) of a main portion of the first embodiment, from a light source device to deflecting means.

Figure 2B:
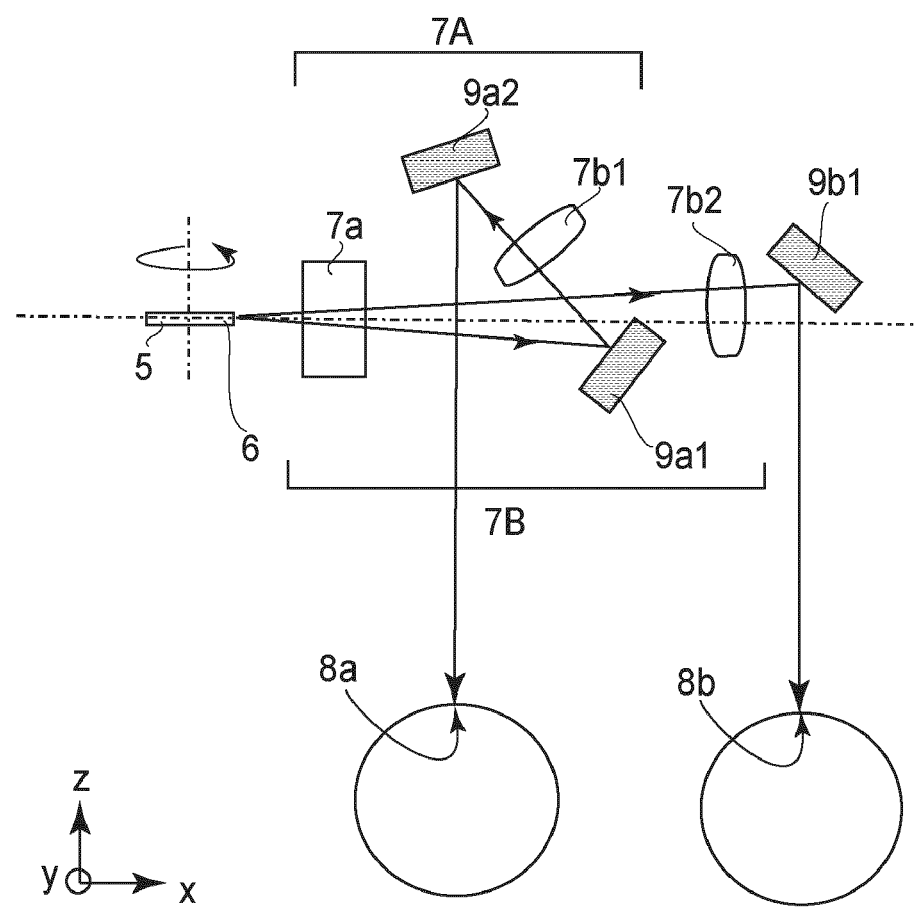
FIG. 2B is a sectional view along the sub-scan section, of an imaging optical system in the first embodiment of the present invention.

FIG. 2B is a sectional view along a sub-scan direction (sub-scan sectional plane) of a main portion of the first embodiment, from the deflecting means to a photosensitive drum.

In this specification, the term "main-scan direction" (Y direction) refers to a direction which is perpendicular to the rotational axis of deflecting means and to the optical axis of an imaging optical system (that is, a direction in which a light beam is scanningly deflected by the deflecting means.

The term "sub-scan direction" refers to a direction which is parallel to the rotational axis of the deflecting means.

The term "main-scan section" refers to a plane that contains the main-scan direction and the optical axis.

The term "sub-scan section" refers to a plane which contains the optical axis and is perpendicular to the main-scan sectional plane.

Denoted in FIG. 1 and FIG. 2A at 1a and 1b are light source devices each having two or more light emitting members (light emission points) which are spaced apart from each other in the main-scan direction and the sub-scan direction. These light source devices comprise a monolithic multiple-beam semiconductor laser, for example.

The present embodiment shows an example wherein each light source device 1a (1b) comprises two light emitting members 1a-1 and 1a-2 (1b-1 and 1b-2). However, any number of light emitting members may be used. If three or more light emitting members are used, two light emitting members of them which are most spaced apart from each other both in the main-scan direction and the sub-scan direction may be taken in the following description.

Denoted at 3a (3b) is an aperture stop (aperture) which functions to restrict passage of a light beam thereby to shape the beam profile.

Denoted at 2a (2b) is a condenser lens (hereinafter, "collimator lens") as a converting optical element, and it functions to convert two light beams emitted from the light source device 1a (1b) into parallel light.

Denoted at 4 is a lens system (hereinafter, "cylindrical lens") which has a power (refracting power) only within the sub-scan section (sub-scan direction). Within the sub-scan section, the cylindrical lens functions to image the two light beams passed through the collimator lens 3a (3b) into a linear image on the deflecting surface 6 of an optical deflector 5.

It should be noted that the collimator lens 2a (2b) and the cylindrical lens 4 may be provided by a single optical element.

The aperture stop 3a, collimator lens 2a and cylindrical lens 4 are components of an input optical system LA. On the other hand, the aperture stop 3b, collimator lens 2b and cylindrical lens 4 are components of an input optical system LB. Namely, the cylindrical lens 4 is shared by the input optical systems LA and LB.

Denoted at 5 is an optical deflector as deflecting means. It comprises a rotary polygonal mirror (polygon mirror) having four surfaces, for example, and it is rotated at constant speed in the direction of an arrow A in the drawing, by driving means such as a motor (not shown).

Denoted at 7A (7B) is an imaging optical system having a light collecting function and an fθ characteristic. It is comprised of a first imaging lens 7a having positive power (refracting power) in the main-scan section and a second imaging lens 7b1 (7b2) of positive power in the sub-scan section.

The imaging optical system 7A (7B) serves to image the two light beams based on the imagewise information, being scanningly deflected by the optical deflector 5, upon the photosensitive drum surface 8a (8b) as a surface to be scanned.

In this embodiment, each of the photosensitive drum surfaces 8a and 8b is scanned with two light beams. Furthermore, each imaging optical system 7A (7B) provides an optically conjugate relationship between the deflecting surface 6 of the optical deflector 5 and the photosensitive drum surface 8a (8b) within the sub-scan section, by which surface tilt compensation is accomplished.

Denoted in FIG. 2B at 9a1, 9a2 and 9b1 are reflecting mirrors as light beam separating means. They function to separate the light beam, scanningly deflected by the optical deflector 5, into an upper oblique-incidence light beam and a lower oblique-incidence light beam, in the imaging optical systems 7A and 7B.

Denoted at 8a (8b) is the photosensitive drum surface as the scanned surface.

Actually, the optical scanning device of this embodiment is incorporated into a color image forming apparatus in which four photosensitive drum surfaces are simultaneously optically scanned by use of a single (common) optical deflector 5. Although not shown in FIG. 1 another imaging optical system similar to that shown in FIG. 1 is provided at an opposite side (left-hand side in the drawing) of the imaging optical system 7A (7B), across the optical deflector 5.

The following description will be made with regard to the right-hand side imaging optical system across the optical deflector 5 in the drawing (namely, for the imaging optical system which optically scans the photosensitive drum surface 8a or 8b).

In the present embodiment, the two light beams emitted from the light source device 1a (1b) pass through the aperture stop 3a (3b) by which the light beam (light quantity) is restricted (partially blocked). Then, by means of the collimator lens 2a (2b), they are converted into parallel light which enters the cylindrical lens 4.

As far as the main-scan section is concerned, the parallel light beam incident on the cylindrical lens 4 goes out of it without being changed thereby. On the other hand, within the sub-scan section, it is converged and imaged into a line image (linear image elongating in the main-scan direction) upon the deflecting surface 6 of the optical deflector (rotary polygonal mirror) 5.

Here, the two light beams emitted from the light source device 1a (1b) are incident on the deflecting surface 6 of the optical deflector 5 obliquely in the sub-scan section (oblique incidence optical system) with respect to a normal to the deflecting surface.

Then, the two light beams scanningly deflected by the deflecting surface 6 of the optical deflector 5 are imaged into a spot shape on the photosensitive drum surface 8a (8b), by means of the imaging optical system 7A (7B) and via the reflecting mirrors 9a1 and 9a2 (9b1). Then, by rotating the optical deflector 5 in the direction of an arrow A, the photosensitive drum surface 8a (8b) is optically scanned with the two light beam, at a constant speed in the direction of an arrow B (main-scan direction).

In this manner, image recording is carried out on the photosensitive drum surface 8a (8b) as the recording medium.

In the present embodiment, the same surface 8a (8b) is scanned simultaneously with two light beams emitted from the light source device 1a (1b) having two light emitting members 1a1 and 1a2 (1b1 and 1b2), while keeping these light beams separated from each other in the sub-scan direction. This assures a higher printing speed.

Furthermore, for higher optical efficiency, the multi-semiconductor laser having two light emitting members 1a1 and 1a2 (1b1 and 1b2) spaced apart from each other by 90 μm is rotated by 5.53 deg. about the optical axis (central axis) of the semiconductor laser. As a result of this, the two light emitting members are spaced apart from each other by about 8.7 μm in the sub-scan direction, and a pitch spacing of the two light beams in the sub-scan direction which is equal to 42.3 μm (=25.4/600 dpi) is accomplished on the scanned surface. Here, the two light emitting members 1a1 and 1a2 (1b1 and 1b2) are spaced apart from each other by 90 μm in the main-scan direction.

In the present embodiment, for reduction in size of the optical scanning device, four light beams are reflected by the same (common) deflecting surface 6 of the optical deflector 5. Then, by using these four light beams scanningly deflected by the deflecting surface 6, two photosensitive drum surfaces 8a and 8b are simultaneously optically scanned, each being based on two light beams.

In order to realize such a structure in the present embodiment, two input optical systems LA and LB are disposed above and below with respect to the sub-scan direction (z direction). Then, two light beam emitted from the input optical systems LA and LB are so projected on the deflecting surface 6 that one is incident on the deflecting surface 6 from obliquely above with an angle 3 deg. while the other is incident on the deflecting surface 6 from obliquely below with an angle 3 deg. both within the sub-scan section.

The imaging optical systems 7A and 7B have a common first lens 7a, by which the overall system is compactified.

In the present embodiment, four light beams scanningly deflected by the optical deflector 5 are separated into a couple of groups each comprising two light beams, by means of the reflecting mirrors 9a1, 9a2 and 9b1. Then, these two groups of light beams are directed to the two photosensitive drum surfaces 8a and 8b, respectively. Furthermore, in this embodiment, for separation of the light beams, the oblique incidence angle α in the sub-scan section of the light beam incident on the deflecting surface 6 of the optical deflector 5 is made as large as 3 deg. as described above.

Furthermore, in the present embodiment, for making smaller the holding member (not shown) for holding the two light source devices 1a and 1b, the optical axes of the input optical systems LA and LB are tilted within the main-scan section to ensure that the angle thereof with respect to the optical axes of the imaging optical systems 7A and 7B becomes equal to 90 deg.

Here, optical scanning devices so structured as described above may have an inconvenience that, when as described before two light beams are incident on the deflecting surface 6 of the optical deflector 5 from an oblique direction within the sub-scan section, there occurs pitch unevenness of two light beams (hereinafter, simply "multi-pitch unevenness").

In consideration of this, in the present embodiment, to reduce the multi-pitch unevenness to an acceptable level in regard to the image formation, specific numerical values of the input optical systems LA and LB, deflecting means 5 and imaging optical systems 7A and 7B are determined to satisfy conditional expression (1) below.

More specifically, in the present embodiment, the maximum pivot angle (largest effective-scan-field-angle) of the rotary polygonal mirror 5 for scanning the effective region on the scanned surface 8a (8b) is denoted by $\theta_{max}$ [deg]. Then, the angle which is defined in the main-scan section between the optical axis of the input optical system LA (LB) and the optical axis of the imaging optical system 7A (7B) is denoted by 2ø [deg]. Furthermore, the focal length of the collimator lens 2a (2b) is denoted by $f_{col}$ [mm], and the spacing (interval) between the two light emitting members 1a1 and 1a2 (1b1 and 1b2) in the main-scan section is denoted by a [mm]. If three or more light emitting members are used, the distance between those light emitting members which are at the opposite ends is taken as the spacing. Namely, the interval between two most spaced apart light emitting members is taken as the spacing.

Furthermore, the maximum value of the oblique incidence angles of the two light beams incident on the deflecting surface 6 of the rotary polygon mirror 5 in the sub-scan section is denoted by α [deg].

When at least three light beams are incident on the deflecting surface 6 of the rotary polygonal mirror at certain oblique incidence angles within the sub-scan section, the oblique incidence angle α ([deg] is defined as the maximum angle of these oblique incidence angles of these at least three light beams.

Describing it in more detail, the oblique incidence angle α ([deg] is defined as the largest one of the oblique incidence angles made by the principal rays of the at least three light beams within the sub-scan section.

For example, if four ore more light beams are incident on the deflecting surface t of the rotary polygon mirror 5 at oblique incidence angles within the sub-scan section, the oblique incidence angle is defined here as the largest one of the oblique incidence angles in the sub-scan section made by the principal rays of two light beams at the opposite ends.

Furthermore, the imaging magnification in the sub-scan section of the imaging optical system 7A (7B) is denoted βs, the inscribing radius of the rotary polygonal mirror 5 is denoted by R [mm], and the resolution of the image in the sub-scan direction is denoted by DPI [dot/inch].

Then, the following condition is satisfied.

$$\left| \frac{\tan\theta_{max}}{\cos\phi} \times \frac{a}{fcol} \times R \times \beta s \times \tan\alpha \times \frac{DPI}{25.4} \right| \leq |0.05| \quad (1)$$

Next, the reason why the multi-pitch unevenness can be controlled to an acceptable level in regard to image formation if conditional expression (1) above is satisfied, will be explained.

In the main-scan section, two divergent light beams emitted from the two light emitting members 1a1 and 1a2 (1b1 and 1b2) spaced apart from each other by a distance a [mm] in the main-scan direction are converted into parallel light by means of the same collimator lens 2a (2b).

In such case, each light emitting member 1a1 or 1a2 (1b1 or 1b2) has a field angle relative to the optical axis of the collimator lens 2a (2b). Therefore, depending on the focal length $f_{col}$ [mm] of the collimator lens 2a (2b), the two light beams coming out of the collimator lens 2a (2b) have an angular difference σ [deg].

Here, the angular difference σ [deg] can be expressed by the following equation, as described hereinabove.

$$\sigma = 2 \text{Arctan}(a/2f_{col}) [\text{deg}] \quad (A)$$

Figure 3:
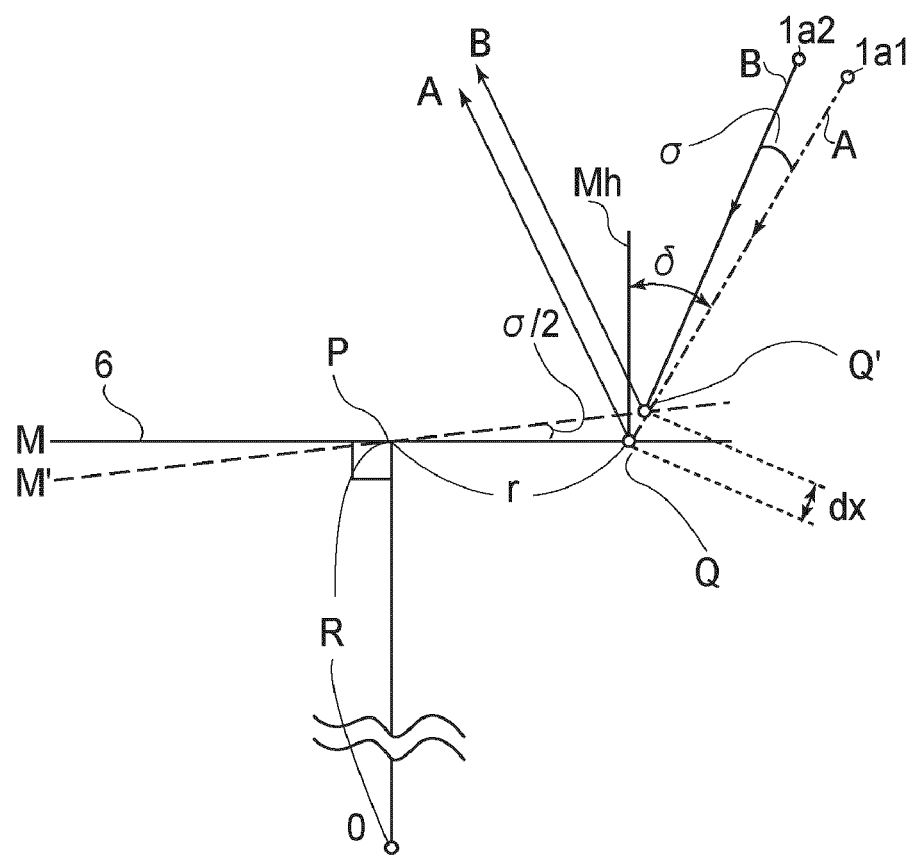
FIG. 3 is a schematic diagram for explaining the amount of deviation ΔdX of the deflection point in the first embodiment of the present invention.

FIG. 3 is a schematic diagram for explaining deviation of the point of deflection for the beam B relative to the beam A, which occurs when a rotary polygonal mirror pivots by a very small angle σ/2 so as to scanningly deflect two light beam (e.g. beams A and B) having an angular difference σ in the main-scan section as described above, toward the same image height.

In FIG. 3, the center of rotation of the rotary polygonal mirror 5 is denoted by O, the inscribing radius thereof is denoted by R, the center of the deflecting surface 6 of the rotary polygonal mirror 5 is denoted by P, and the position of the deflecting surface 6 for scanningly deflecting the beam A is depicted by M (solid line). On the other hand, the deflection point when the beam A inclined by an angle δ with respect to the surface normal Mh at the position M of the deflecting surface 6 is incident, is denoted by Q.

Further, the distance between the deflection point Q and the deflecting surface center P for the beam A is denoted by r. The position of the deflecting surface 6 of the rotary polygon mirror 5 as the same is inclined by a minute angle σ/2 is depicted by M' (dotted line).

Furthermore, the deflection point when the beam B is incident on the position M' (dotted line) of the deflecting surface is denoted by Q'.

In FIG. 3, the two light beams A and B having an angular difference σ in the main-scan section are deflected by the rotary polygonal mirror 5 so as to scan the surface 8 while these light beams are kept spaced apart from each other on the scan surface 8. Here, in order that these two light beams are deflected toward the same image height, it is necessary that the rotary polygonal mirror 5 have different pivot angles for the beams A and B, being different by σ/2 [deg].

Since then the deflecting surface 6 of the rotary polygonal mirror 5 deviates from the solid-line position M to the dotted-line position M', the deflection point Q' of the beam B shifts by dX [mm] relative to the deflection point Q of the beam A in the beam advancement direction.

Figure 4:
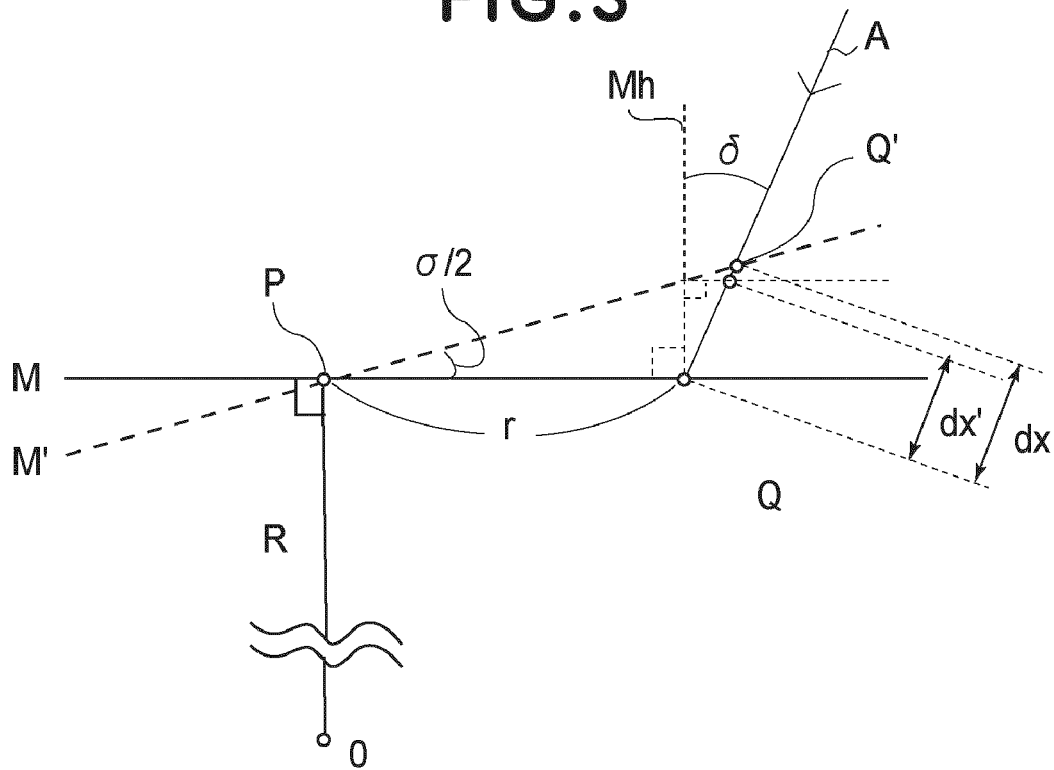
FIG. 4 is an enlarged view of FIG. 3.

FIG. 4 is an enlarged view of FIG. 3, and it is a schematic diagram which depicts the relationship between the amount of deviation dX and several values. It is seen from FIG. 4 that the amount of deviation dX' [mm] in the drawing can be detected in accordance with the following equation.

$$dX' = r \times \tan\left(\frac{\sigma}{2}\right) \times \frac{1}{\cos\delta}$$

Here, since the angle σ/2 is sufficiently small, it follows that dX≈dX'.

Hence, the amount of deviation dX [mm] between the deflection point Q of the beam A and the deflection point Q' of the beam B here can be expressed as follows.

$$dX \fallingdotseq r \times \tan\left(\frac{\sigma}{2}\right) \times \frac{1}{\cos\delta} \quad (B)$$

When equation (A) is substituted into equation (B), it follows that:

$$dX \fallingdotseq r \times \frac{a}{2 \times fcol} \times \frac{1}{\cos\delta} \quad (B')$$

Here, the distance r [mm] between the deflecting surface center P of the rotary polygonal mirror 5 and the deflection point Q when the pivot angle of the rotary polygonal mirror 5 is θ [deg], is given by an approximation formula as follows.

$$r \approx R*\tan\theta \quad (C)$$

The reason why it can be expressed by approximation formula (C), will be explained below using FIG. 5.

Figure 5:
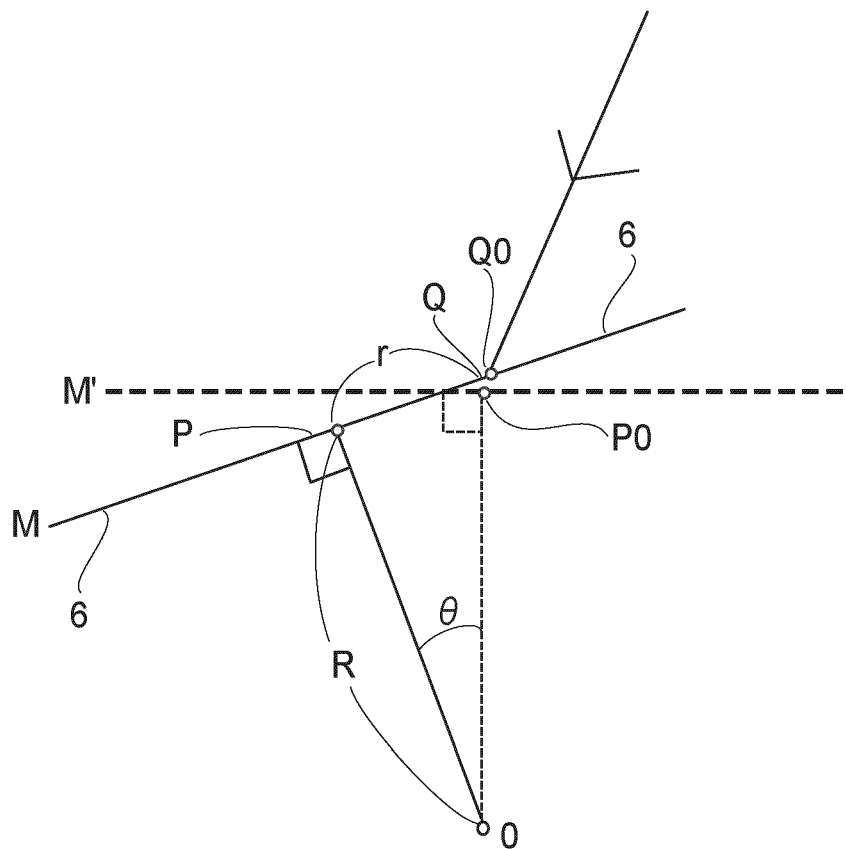
FIG. 5 is a diagram illustrating the state of incidence of a light beam on a deflecting surface in first embodiment of the present invention.

FIG. 5 is a schematic diagram which depicts the state of incidence of the light beam on the deflecting surface 6 in the main-scan section, which beam is directed by the input optical system.

In FIG. 5, the center of rotation of the rotary polygonal mirror 5 is at point O, and the deflecting surface 6 of the rotary polygonal mirror 5 at the axial image height is at position M' (dotted line). On the other hand, the center of the deflecting surface 6 at position M' is at point P0, and the deflection point at that time is at point Q0.

The position of the deflecting surface 6 of the rotary polygonal mirror 5 at an arbitrary pivot angle θ of the rotary polygonal mirror 5 is at M (solid line). The center of the deflecting surface 6 at the position M is at point P, and the deflection point of the rotary polygonal mirror 5 at an arbitrary pivot angle θ is at Q.

In ordinary optical scanning devices, for efficient utilization of the deflecting surface 6, the components will be arranged so that the light beam is incident at the center P0 of the deflecting surface 6 of the rotary polygonal mirror 5 when θ=0 deg. As a result, the deflection point Q0 at the axial image height and the central point P0 of the deflecting surface 6 will coincide with each other.

Here, at an arbitrary pivot angle θ and for a distance r, the amount of deviation from the central point P0 to the deflection point Q is sufficiently small. Therefore, the distance r can be approximated in terms of the distance from the central point P of the deflecting surface 6 at the position M to the central point P0 thereof at the position M'.

Hence, it can be expressed by:

$$r \approx R*\tan\theta \quad (C)$$

When approximation formula (C) is substituted into equation (B'), it follows that:

$$dX = R \times \frac{a}{2 \times fcol} \times \frac{\tan\theta}{\cos\phi} \quad (B'')$$

It is seen from FIG. 4 that, when the position of the deflection point Q shifts by a deviation amount dX in the main-scan section, the position of the deflection point in the sub-scan section as well changes in response to it, in accordance with the oblique incidence angle α.

When the amount of deviation in height of the deflection point in the sub-scan section, here, is denoted by ΔdZ [mm], it can be expressed as follows.

$$\Delta dZ = R \times \frac{a}{2 \times fcol} \times \frac{\tan\theta}{\cos\phi} \times \tan\alpha \quad (D)$$

Thus, when the deflection points of the two beams deviate from each other around the deflecting surface in the sub-scan direction, upon the scanned surface, the deviation amount ΔdZ [mm] of the spacing of the two beams on the scanned surface in the sub-scan direction is given by the following equation.

$$\Delta dZ = R \times \frac{a}{2 \times fcol} \times \frac{\tan\theta}{\cos\phi} \times \beta s \times \tan\alpha \quad (E)$$

Here, the deviation amount $\Delta dZ_{max}$ [mm] at the maximum pivot angle $\theta_{max}$ [deg] of the rotary polygonal mirror 5 when the effective region of the scanned surface 8 is scanned, can be expressed as follows.

$$\Delta dZ\max = R \times \frac{a}{2 \times fcol} \times \frac{\tan\theta_{max}}{\cos\phi} \times \beta s \times \tan\alpha \quad (F)$$

Furthermore, the deviation amount $\Delta dZ_{min}$ [mm] at the smallest pivot angle $\theta_{min}$ [deg] of the rotary polygonal mirror 5 when the effective region of the scanned surface 8 is scanned, can be expressed as follows.

$$\Delta dZ\min = R \times \frac{a}{2 \times fcol} \times \frac{\tan\theta_{min}}{\cos\phi} \times \beta s \times \tan\alpha \quad (G)$$

In these equations, parameters R, a, $f_{col}$, cos ø, βs and α are all constant regardless of the pivot angle θ of the rotary polygonal mirror. Therefore, the peak-to-peak (PP) of the deviation of spacing between two light beams on the scanned surface in the sub-scan direction, within the effective scan region, can be expressed by the following equation.

More specifically, if the multi-pitch unevenness caused by deflection point deviation between two light beams on the deflecting surface is denoted by ΔdZpp [mm], it can be expressed by the following equation.

$$\Delta dZpp = |\Delta dZ\max - \Delta dZ\min| \quad (H)$$

$$= \left| \left(R \times \frac{a}{2 \times fcol} \times \frac{\tan\theta_{max}}{\cos\phi} \times \beta s \times \tan\alpha\right) - \left(R \times \frac{a}{2 \times fcol} \times \frac{\tan\theta_{max}}{\cos\phi} \times \beta s \times \tan\alpha\right) \right|$$

Here, Since $\theta_{max}=-\theta_{min}$, equation (H) can be rewritten as follows.

$$\Delta dZpp = |\Delta dZmax - \Delta dZmin| \qquad (H')$$

$$= \left| R \times \frac{a}{fcol} \times \frac{\tan\theta_{max}}{\cos\phi} \times \beta s \times \tan\alpha \right|$$

Furthermore, if the structure is so set that the light beam is incident with deviation from the deflecting surface center when θ=0 deg., namely, even if the deflection point Q0 and the position of the central point P0 are mutually deviated, the deviation amount dXmin at the smallest pivot angle $\theta_{min}$ will enlarge by an amount corresponding to the enlargement of the amount of deviation dXmax at the maximum pivot angle $\theta_{max}$.

When the peak-to-peak (pp) of the deviation amount of the deflection point is expressed by dXpp (=|dXmax−dXmin|), since dXpp does not change, if the peak-to-peak of the multi-pitch unevenness is expressed by dZpp (=|dZmax−dZmin|), dZpp as well does not change.

Therefore, even if the structure is set so that the light beam is incident with deviation from the deflecting surface center when θ=0 deg, the peak-to-peak of the multi-pitch unevenness pp:dZpp caused by the deflection point deviation between two beams on the deflecting surface, can be expressed by equation (H') mentioned above.

In multiple-beam scanning optical systems used in image forming apparatuses and having an oblique incidence optical system, the multi-pitch unevenness due to deflection point deviation between two beams on the deflecting surface described hereinbefore is one prime factor for causing the multi-pitch unevenness.

Furthermore, the direction in which the deflection points of the two beams deviate on the deflecting surface is laterally asymmetric within the effective scan region. As a result, The multi-pitch unevenness due to the deflection point deviation between the two beams occurs asymmetrically.

As described above, the multi-pitch unevenness due to the deflection point deviation between two beams on the deflecting surface is one prime factor for causing the multi-pitch unevenness. Since it is laterally asymmetric, if it occurs, it is very conspicuous as deterioration of the image when observed through naked eyes.

In consideration of this, in the present embodiment, the components are so set to satisfy conditional expression (1) mentioned above, to thereby reduce the multi-pitch unevenness due to the deflection point deviation between two light beams on the deflecting surface. This ensures good image formation.

The left-hand side of conditional expression (1) represents the ratio of the approximate value of pp:dZpp of the multi-pitch unevenness due to the deflection point deviation between two beams on the deflecting surface, relative to the line spacing on the scanned surface in the sub-scan direction. Specifically, conditional expression (1) shows that the approximate value of pp:dZpp of multi-pitch unevenness due to the deflection point deviation is 5% or less, relative to the line spacing in the sub-scan direction.

Here, Table 1 below shows specific numerical values of the present embodiment.

In the present embodiment, as seen from the values in Table 1, the maximum pivot angle of the rotary polygonal mirror 5 is $\theta_{max}$=19.1 deg. and the angle 2ø defined between the optical axis of the input optical system LA (LB) and the optical axis of the imaging optical system 7A (7B) is 2ø=90 deg. Furthermore, the spacing a between the light emitting members in the main-scan direction is a=0.09 mm, and the focal length $f_{col}$ of the collimator lens 2a (2b) is $f_{col}$=20 mm. Further, the inscribing radius R of the rotary polygonal mirror (polygon mirror) 5 is R=7.1 mm, and the oblique incidence angle α (is 3 deg. The imaging magnification βs of the imaging optical system 7A (7B) in the sub-scan section is βs=1.3×, and the resolution DPI [dot/inch] in the sub-scan direction is DPI [dot/inch]=600 dpi.

Therefore, the left-hand side of conditional expression (1) is equal to 0.025, and this satisfies conditional expression (1).

More specifically, in the present embodiment, pp:dZpp of the multi-pitch unevenness due to the deflection point deviation between two light beams on the deflecting surface 6 is reduced to around 2.5% of the line spacing 42.3 μm in the sub-scan direction.

Here, if three or more light beams are used, the two beams mentioned above are those two beams which are most spaced apart from each other both in the main-scan direction and the sub-scan direction, as described hereinbefore.

Figure 6:
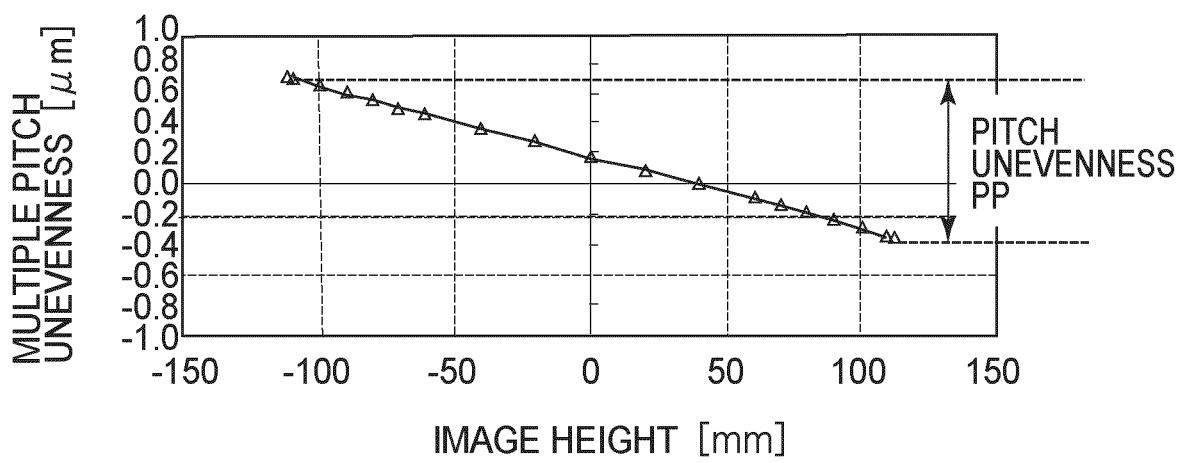
FIG. 6 is a graph illustrating pitch unevenness in the first embodiment of the present invention.

FIG. 6 is a graph which depicts the multi-pitch unevenness caused by the deflection point deviation between two beams on the deflecting surface, in the present embodiment.

It is seen from FIG. 6 that pp:dZpp of the multi-pitch unevenness is around 1.1 μm, and if has been confirmed that the magnitude is kept around 2.5% of the line spacing 42.3 μm in the sub-scan direction of the present embodiment.

It should be noted that, in the present embodiment, as long as conditional expression (1) is satisfied, deterioration of the image as the same is observed through naked eyes is not conspicuous. Thus, advantageous effects of the present embodiment are well assured.

More preferably, conditional expression (1) mentioned above had better be set as follows.

$$\left| \frac{\tan\theta_{max}}{\cos\phi} \times \frac{a}{fcol} \times R \times \beta s \times \tan\alpha \times \frac{DPI}{25.4} \right| \leq |0.025| \qquad (1a)$$

In the present embodiment, the imaging magnification βs of the imaging optical system in the sub-scan section is made as small as 1.3× and, based on it, the multi-pitch unevenness is reduced to an acceptable level.

It should be noted that, in the present embodiment, as long as conditional expression (1) is satisfied, the multi-pitch unevenness can be reduced to an acceptable level regardless of the magnitude of the imaging magnification βs in the sub-scan section.

More preferably, conditional expression (1) should be satisfied and, on the other hand, the imaging magnification βs in the sub-scan direction should be set to satisfy the following relation.

$$0.5 < |\beta s| < 2.0 \qquad (2)$$

In that occasion, the multi-pitch unevenness can be reduced to an acceptable level, and yet the width of lenses constituting the imaging optical system can be made short to assure simple and convenient structure.

In the present embodiment, the maximum pivot angle $\theta_{max}$ of the rotary polygonal mirror is $\theta_{max}$=19.1 deg. This enables reducing the multi-pitch unevenness to an acceptable level, and also it accomplishes a compact optical scanning device.

It should be noted that, in the present embodiment as long as conditional expression (1) is satisfied, the peak-to-peak (pp) of the multi-pitch unevenness can be lowered to an acceptable level, regardless of the magnitude of the maximum pivot angle $\theta_{max}$ of the rotary polygonal mirror.

However, if the maximum pivot angle $\theta_{max}$ of the rotary polygonal mirror is larger than 25 deg., the imaging magnification βs in the sub-scan section or any other design values must be made extraordinarily small in order to satisfy conditional expression (1). This makes quite difficult to keep the optical scanning device compact.

On the other hand, if the maximum pivot angle $\theta_{max}$ of the rotary polygonal mirror is smaller than 15 deg., the optical path length of the imaging optical system must be prolonged to perform optical scanning of a necessary scan region. Thus, it is difficult to assure compactness.

Therefore, more preferably, conditional expression (1) should be satisfied on one hand and, on the other hand, the maximum pivot angle $\theta_{max}$ [deg] of the rotary polygonal mirror should be set to satisfy the following condition.

$$15 \text{ deg.} < \theta_{max} < 25 \text{ deg.} \quad (3)$$

In that occasion, the multi-pitch unevenness can be reduced to an acceptable level and yet the overall system can be compactified.

In the present embodiment, for further compactification of the overall system, the optical path length of the input optical system had better be short as possible. However, if the spacing a of those two light emitting members, among a plurality of light emitting members of a multiple-beam semiconductor laser, which are most spaced apart from each other in the main-scan direction, is as wide as 100 μm or more, the multi-pitch unevenness will become very large to cause image degradation, unless the focal length of the collimator lens is made long.

On the contrary, when a laser chip having a spacing a as narrow as 20 μm is used, the multi-pitch unevenness can be reduced to an acceptable level even if the focal length of the collimator lens is set a little short.

In consideration of this, in this embodiment, more preferably the following conditional expression (4) is satisfied, in dependence upon the spacing of a plurality of light emitting members of the multiple-beam semiconductor laser.

$$0 < a/f_{col} < 0.02 \quad (4)$$

By satisfying this conditional expression (4), the multi-pitch irregularity can be well suppressed, and the optical path length of the input optical system can be made as short as possible, such that the overall system can be more compactified.

In the present embodiment, $a/f_{col} = 0.0045$ and this satisfies conditional expression (4).

In the present embodiment, the focal length of the collimator lens is set as long as fcol=20 mm.

With this arrangement, the angular difference in the main-scan direction between plural beams is made small, and the peak-to-peak of the multi-pitch unevenness is lowered to an acceptable level.

It should be noted that, in the present embodiment, as long as conditional expression (1) is satisfied, the multi-pitch unevenness can be reduced to an acceptable level regardless of the magnitude of the focal length fcol of the collimator lens. However, if the focal length $f_{col}$ of the collimator lens is shorter than 15 mm, the imaging magnification βs in the sub-scan section or any other design values must be made extraordinarily small in order to satisfy conditional expression (1). This makes quite difficult to keep the optical scanning device compact.

Therefore, more preferably, conditional expression (1) should be satisfied on one hand and, on the other hand, the focal length $f_{col}$ [mm] of the collimator lens should be set to satisfy the following condition.

$$15 \text{ mm} < f_{col} < 80 \text{ mm} \quad (5)$$

In that occasion, the multi-pitch unevenness can be reduced to an acceptable level, the input optical system can be made more compact.

In the present embodiment, the oblique incidence angle α (is made equal to 3 deg. as shown in FIG. 2A. With this arrangement, two sets of light beams can be incident on the deflector from obliquely above and obliquely below within the main-scan section. Hence, this arrangement enables scanningly deflecting four (=2 beams×2 sets) light beams by a single deflecting surface 6 and imaging them upon two photosensitive drums, while on the other hand it assures reducing the multi-pitch unevenness to an acceptable level.

It should be noted that, in the present embodiment, as long as conditional expression (1) is satisfied, even if value of oblique incidence angle α (is large, the multi-pitch unevenness can be reduced to an acceptable level.

However, if the oblique incidence angle α (is larger than 4 deg., the imaging magnification βs in the sub-scan section or any other design values must be made extraordinarily small in order to satisfy conditional expression (1). This makes quite difficult to make the optical scanning device more compact.

Therefore, more preferably, conditional expression (1) should be satisfied and, on the other hand, the oblique incidence angle α ([deg] should be set to satisfy the following condition.

$$2 \text{ deg.} \leq \alpha \leq 4 \text{ deg.} \quad (6)$$

With this arrangement, multi-pitch unevenness can be reduced to an acceptable level, and also the separation angle sufficient for the plurality of light beams from the plurality of light source devices to scan corresponding photosensitive drums.

If the oblique incidence angle α (is made larger than 2 deg., the light beams can be effectively separated from each other by the light-beam separating means which is provided in the imaging optical system 7A (7B).

If the oblique incidence angle α (is made smaller than 4 deg. and conditional expression (1) is satisfied, the multi-pitch unevenness can be suppressed to an acceptable level.

In the present embodiment, total four light source devices or laser units (=2*2: two vertical and two lateral) are held fixed by using a common holding member. Also, for simpler structure of such holding member, in the main-scan section, the angle 2ø defined between the optical axes of the input optical system and the imaging optical system is set to be equal to 2ø=90 deg.

It should be noted that, in the present embodiment, as long as conditional expression (1) is satisfied, the multi-pitch unevenness can be reduced to an acceptable level even if the magnitude of the angle 2ø is large.

However, if in main-scan section the angle 2ø defined between the optical axes of the input optical system and the imaging optical system is larger than 100 deg., the imaging magnification βs in the sub-scan section or any other design values must be made extraordinarily small in order to satisfy conditional expression (1). This makes quite difficult to keep the optical scanning device compact.

Therefore, more preferably, conditional expression (1) should be satisfied on one hand and, on the other hand, the angle 2ø [deg] between the optical axes of the input optical system and the imaging optical system should be set to satisfy the following condition.

$$0 \text{ deg.} \leq 2\emptyset \leq 100 \text{ deg.} \quad (7)$$

With this arrangement, the multi-pitch unevenness can be reduced to an acceptable level, and yet the input optical system can be made more compact.

In the present embodiment, the upper and lower cylindrical lenses 4 of the input optical systems LA and LB are integrally molded by using a resin, to enable easy manufacture and lightweight. However, the advantageous effects of the present embodiment are well attainable even if the upper and lower cylindrical lenses 4 are not integrally molded.

It should be noted that, although the present embodiment has bee described with reference to a color image forming apparatus which comprises a plurality of light source devices having a plurality of light emitting members and a plurality of photosensitive drums corresponding to these light source devices, the invention is not limited to this. For example, the invention is applicable to a monochromatic image forming apparatus which comprises single light source device having a plurality of light emitting members and single photosensitive drum.

Table 1 shows a specific structure of the imaging optical system 7A (7B) in the first embodiment. Table 2 shows parameters r, d and n of the input optical system LA (LB) in the first embodiment. Furthermore, Table 3 shows the aspherical surface shape in the first embodiment.

Embodiment 2

Figure 7:
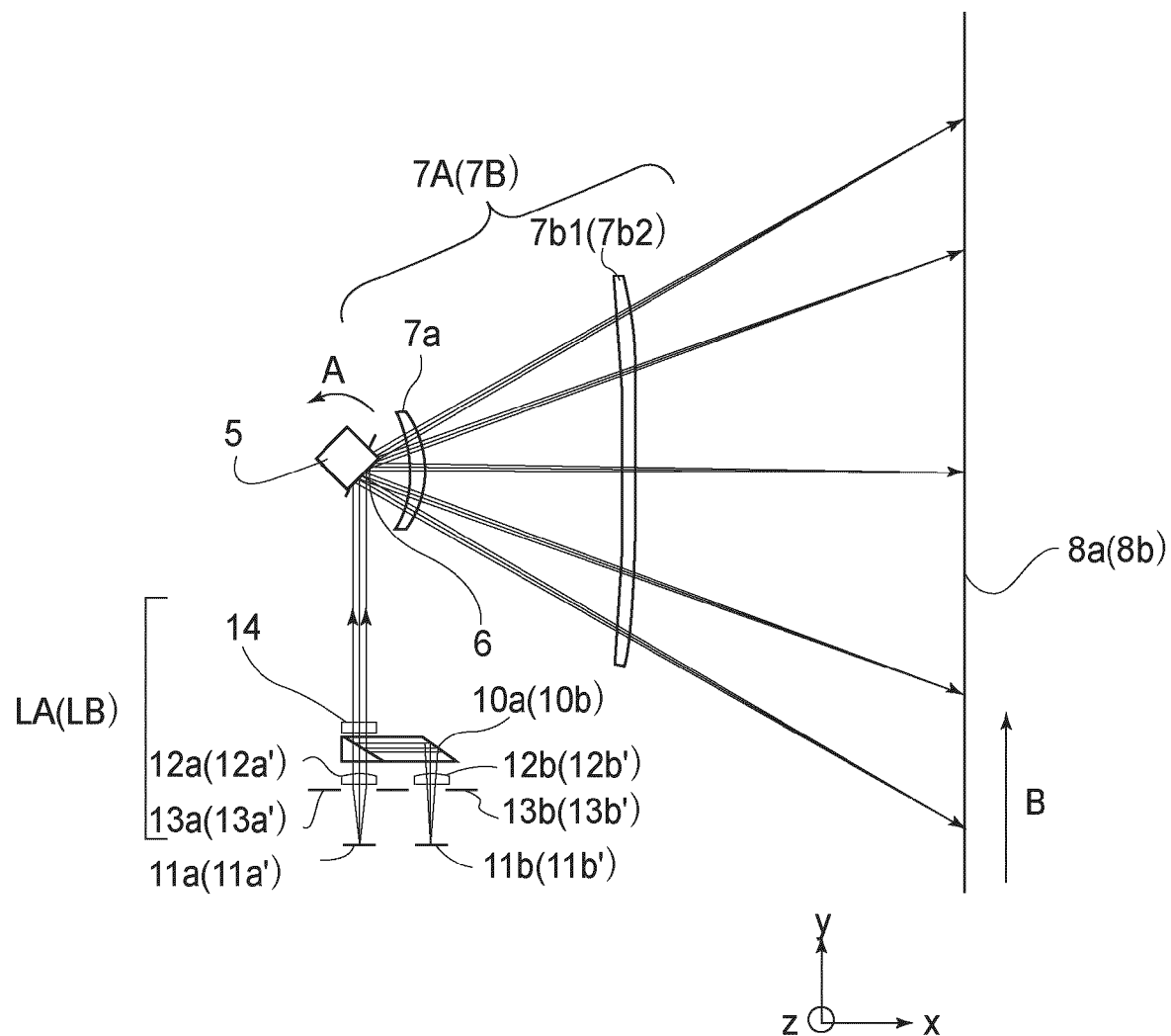
FIG. 7 is a sectional view along a main-scan section, of a second embodiment of the present invention.

FIG. 7 is a sectional view along a main-scan direction (main-scan sectional plane) of a main portion of a second embodiment of the present invention.

Figure 8A:
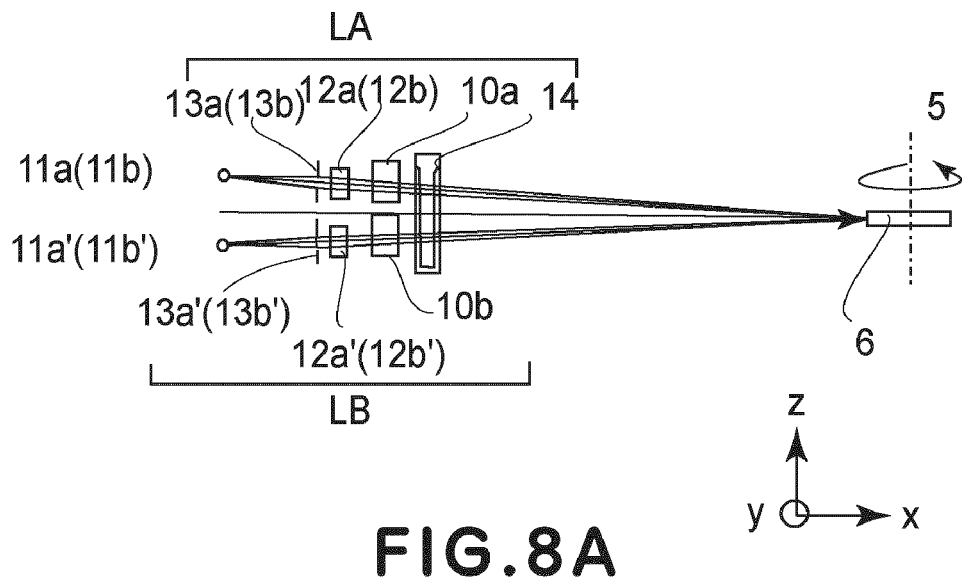
FIG. 8A is a sectional view along a sub-scan section, of an input optical system in the second embodiment of the present invention.

FIG. 8A is a sectional view along a sub-scan direction (sub-scan sectional plane) of a main portion of the second embodiment, from a light source device to deflecting means.

Figure 8B:
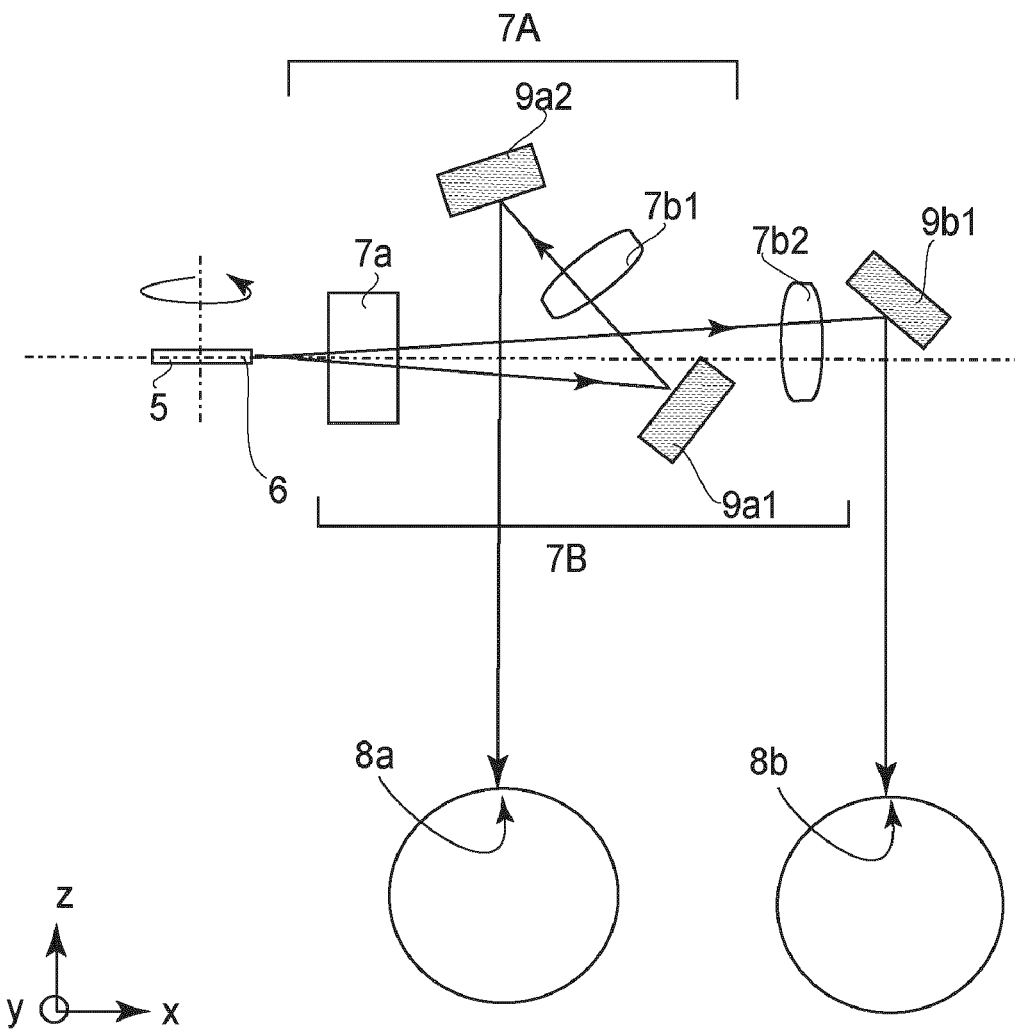
FIG. 8B is a sectional view along the sub-scan section, of an imaging optical system in the second embodiment of the present invention.

FIG. 8B is a sectional view along a sub-scan direction (sub-scan sectional plane) of a main portion of the second embodiment, from the deflecting means to a photosensitive drum.

In FIGS. 7, 8A and 8B, like numerals are assigned to components corresponding to those shown in FIGS. 1, 2A and 2B.

The present embodiment differs from the first embodiment in that the optical scanning device is comprised of two or more component sets (light input units) each comprising a light source device with a single light emitting member and a collimator lens, and that two or more light beams emitted from the two or more sets are incident on the deflecting surface of deflecting means from an oblique direction within the sub-scan section.

TABLE 1

TABLE 1: STRUCTURE OF FIRST EMBODIMENT

| | | | |
|---|---|---|---|
| Angle between Optical Axes of Input Optical System and Imaging Optical System in Main-Scan Direction | 2φ | 90 | (deg) |
| Maximum Effective Scan Field Angle | +/− θmax | 45 | (deg) |
| Spacing of Light Emitting Members in Main-Scan Direction | A | 0.09 | (mm) |
| Focal Length of Collimator Lens | Fcol | 20 | (mm) |
| Inscribing Radius of Polygonal Mirror | R | 7.07 | (mm) |
| Sub-Scan Oblique Incidence Angle | α | 3 | (µm) |
| Sub-Scan Magnification of Imaging Optical System | Bs | 1.3 | (x) |
| Resolution in Sub-Scan Direction | Dpi | 600 | (dpi) |
| Effective Scan Width | W | 224 | (mm) |
| f-θ Coefficient of Imaging Optical System | K | 167.8 | (mm/rad) |

TABLE 2

TABLE 2: RDN OF FIRST EMBODIMENT

| | Surface | R | D | N |
|---|---|---|---|---|
| Light Emitting Member 1 of Semiconductor Laser | 1st Surface | — | 16 | 1 |
| Stop | | — | 2.32 | 1 |
| Collimator Lens 2 | 2nd Surface | infinite | 3 | 1.7617 |
| | 3rd Surface | −15.22 | 12.43 | 1 |
| Cylindrical Lens 4 | 4th Surface | Table 3 | 3 | 1.524 |
| | 5th Surface | infinite | 77.26 | 1 |
| Deflecting Surface 6 of Rotary Polygonal Mirror | 6th Surface | infinite | | 1 |

TABLE 3

TABLE 3: CYLINDRICAL LENS OF FIRST EMBODIMENT

| Cylindrical Lens 4 | | 4th Surface |
|---|---|---|
| Meridional Shape | R | infinite |
| Sagittal Shape | r | 58.62 |

Other structures and optical functions are similar to the first embodiment and, based on this, similar advantageous effects are obtainable.

More specifically, denoted in these drawings at 11a and 11b (11a' and 11b') are light source devices, each comprising a single-beam semiconductor laser having a single light emitting member.

Denoted at 13a and 13b (13a' and 13b') are aperture stops (apertures) which are provided in relation to the light source devices 11a and 11b (11a' and 11b'), respectively, to restrict passage of the light beam to shape its beam profile.

Denoted at 12a and 12b (12a' and 12b') are collimator lenses as a conversion optical element, which are provided in relation to the light source devices means 11a and 11b (11a' and 11b'), respectively. The collimator lenses 12a and 12b (12a' and 12b') convert the light beams emitted from the light source devices 11a and 11b (11a' and 11b') into parallel light.

Specifically, this embodiment is provided with four component sets (light input units) of each having a light source device (11a, 11b, 11a' or 11b') and a collimator lens (12a, 12b, 12a' or 12b').

Denoted at 10a (10b) is beam combining means which is comprised of a plurality of prisms and functions to deflect the light beams from the light source devices 11a and 11b (11a' and 11b') so that they have an angular difference σ [deg] in the main-scan direction.

Denoted at 14 is a cylindrical lens which has a power only in the sub-scan section. It functions to image the light beams, passed through the beam combining means 10a and 10b, upon the deflecting surface 6 of the rotary polygonal mirror (polygon mirror) 5 as a line image in the sub-scan section.

Here, the components such as aperture stops 13a and 13b, collimator lenses 12a and 12b, and cylindrical lens 14 are constituent elements of the input optical system LA. Furthermore, the components such as aperture stops 13a' and 13b', collimator lenses 12a' and 12b', and cylindrical lens 14 are constituent elements of the input optical system LB.

In the present embodiment, like the abovementioned first embodiment, in order to suppress the multi-pitch unevenness to an acceptable level in relation to image formation, the specific numerical values of the input optical systems LA and LB, deflecting means 5, and the imaging optical systems 7A and 7B are so set as to satisfy conditional expression (8) to be mentioned below.

More specifically, in the present embodiment, using parameters described hereinbefore and if, in the main-scan section, the angular difference between two light beams emitted from the two light source devices 11a and 11b (11a' and 11b') and incident on the deflecting surface 6 is denoted by σ [deg], the following condition is satisfied.

$$\left| \frac{\tan\theta_{max}}{\cos\phi} \times \tan(\sigma) \times R \times \beta s \times \tan\alpha \times \frac{DPI}{25.4} \right| \leq |0.05| \quad (8)$$

Conditional expression (8) above can determined by substituting previously described equation (A) into conditional expression (1).

It should be noted that the number of light beams emitted from the light source devices 11a and 11b (11a' and 11b') and incident on the deflecting surface 6 is not limited to two. Three or more light beams may be used. If three or more light beams are used, the angular difference σ f those light beams having a largest angular difference is taken as σ [deg].

More preferably, conditional expression (8) had better be set as follows.

$$\left| \frac{\tan\theta_{max}}{\cos\phi} \times \tan(\sigma) \times R \times \beta s \times \tan\alpha \times \frac{DPI}{25.4} \right| \leq |0.025| \quad (8a)$$

In the present embodiment, based on the numerical specifications shown in Table 2, the largest effective pivot angle $\theta_{max}$ of the rotary polygonal mirror (polygon mirror) 5 is $\theta_{max}$=19.1 deg, and the angle 2ø defined between the optical axis of the input optical system LA (LB) and the optical axis of the imaging optical system 7A (7B) is 2ø=90 deg. The incidence angular difference σ of plural beams incident on the deflecting surface 6 in the main-scan section is σ=0.26 deg. Furthermore, the inscription radius R of the rotary polygonal mirror 5 is R=7.1 mm, and the oblique incidence angle α (is α=3 deg. The imaging magnification βs of the imaging optical system 7A (7B) in the sub-scan section is βs=1.3×, and the resolution DPI [dot/inch] in the sub-scan direction is DPI [dot/inch]=600 dpi.

Therefore, the left-hand side of conditional expression (8) is equal to 0.025, and this satisfies conditional expression (8).

In the present embodiment, in place of the light emitting member spacing a in the main-scan direction and the focal length $f_{col}$ of the collimator lens used in conditional expression (1), the incidence angular difference σ of plural beams onto the deflecting surface in the main-scan section is specified. With this arrangement, the pp:dZpp of the multi-pitch unevenness on the deflecting surface due to the deflection point deviation between plural beams can be suppressed.

In the present embodiment, in order to reduce the multi-pitch unevenness on the deflecting surface 6 due to the deflection point deviation between plural beams, the incidence angular difference σ of plural beams onto the deflecting surface in the main-scan section is made as small as 26 deg.

It should be noted that, in the present embodiment, as long as conditional expression (8) is satisfied, the multi-pitch unevenness can be reduced to an acceptable level even if the magnitude of the incident angular difference σis large.

If the incidence angular difference σof plural beams onto the deflecting surface in the main-scan section is larger than 1.0 deg., the imaging magnification βs in the sub-scan section or any other design values must be made extraordinarily small in order to satisfy conditional expression (8). This makes quite difficult to make the overall system more compact.

Furthermore, if the incidence angular difference σ onto the deflecting surface is made equal to 0 deg., synchronization signal detecting means (synchronization detecting sensor) can not detect the timings of these plural beams individually. Therefore, higher precision detection of synchronization signals is no more attainable, and it is quite difficult to reduce misregistration of plural beams in the main-scan direction.

Hence, more preferably, conditional expression (8) should be satisfied on one hand and, on the other hand, the incidence angular difference σ [deg] of plural beams onto the deflecting surface in the main-scan section should be set to satisfy the following condition.

$$0 \text{ deg.} < \sigma < 1.0 \text{ deg.} \quad (9)$$

With this arrangement, the multi-pitch unevenness can be reduced to an acceptable level, and the overall system can be compactified and the printing speed can be increased.

In the present embodiment, by using the beam combining means, the input optical system is made compact while the incidence angular difference σ of plural beams onto the deflecting surface in the main-scan section is kept small.

It should be noted that, if the light source means can be placed remote from the optical deflector so that a plurality of light source devices can be disposed in an array, the advantageous effects of the present embodiment are assured without using such beam combining means.

Although in the present embodiment two light beams are combined by the beam combining means, even if three or more light beams are to be combined, as long as the spacing of two light beams which have a largest angular difference σ in the main-scan direction satisfies conditional expression (8), the pitch unevenness can be reduced to an acceptable level.

Furthermore, although in the present embodiment a single-beam semiconductor laser is used as the light source device, a multiple-beam semiconductor laser may be used for further speed-up, and the advantageous effects of the present embodiment are well provided even in that occasion.

Furthermore, although in this embodiment like the first embodiment described hereinbefore, the invention is applied to a color image forming apparatus which is comprised of a plurality of photosensitive drums, the invention is not limited to this. For example, it can be applied also to a monochromatic optical scanning device comprised of a single photosensitive drum.

Table 4 below shows the structure of the imaging optical system 7A (7B) in the second embodiment. Table 5 shows parameters r, d and n of the input optical system LA (LB) in the second embodiment. Furthermore, Table 6 shows the aspherical surface shape in the second embodiment.

TABLE 4

TABLE 4: SPECIFICATIONS OF SECOND EMBODIMENT

| | | | |
|---|---|---|---|
| Angle between Optical Axes of Input Optical System and Imaging Optical System in Main-Scan Direction | 2φ | 90 | (deg) |
| Maximum Effective Scan Field Angle | +/− θmax | 45 | (deg) |
| Spacing of Light Emitting Members in Main-Scan Direction | σ | 0.09 | (mm) |
| Focal Length of Collimator Lens | Fcol | 20 | (mm) |
| Inscribing Radius of Polygonal Mirror | R | 7.07 | (mm) |
| Sub-Scan Oblique Incidence Angle | α | 3 | (µm) |
| Sub-Scan Magnification of Imaging Optical System | Bs | 1.3 | (x) |
| Resolution in Sub-Scan Direction | Dpi | 600 | (dpi) |
| Effective Scan Width | W | 224 | (mm) |
| f-θ Coefficient of Imaging Optical System | K | 167.8 | (mm/rad) |

TABLE 5

TABLE 5: RDN OF SECOND EMBODIMENT

| | Surface | R | D | N |
|---|---|---|---|---|
| Light Emitting Member 1 of Semiconductor Laser | 1st Surface | — | 16 | 1 |
| Stop | | | 2.32 | 1 |
| Collimator Lens 2 | 2nd Surface | infinite | 3 | 1.7617 |
| | 3rd Surface | −15.22 | 12.43 | 1 |
| Cylindrical Lens 4 | 4th Surface | Table 6 | 3 | 1.524 |
| | 5th Surface | infinite | 77.26 | 1 |
| Deflecting Surface 6 of Rotary Polygonal Mirror | 6th Surface | infinite | | 1 |

TABLE 6

TABLE 6: CYLINDRICAL LENS OF SECOND EMBODIMENT

| Cylindrical Lens 4 | | 4th Surface |
|---|---|---|
| Meridional Shape | R | infinite |
| Sagittal Shape | r | 58.62 |

Embodiment of Image Forming Apparatus

Figure 9:
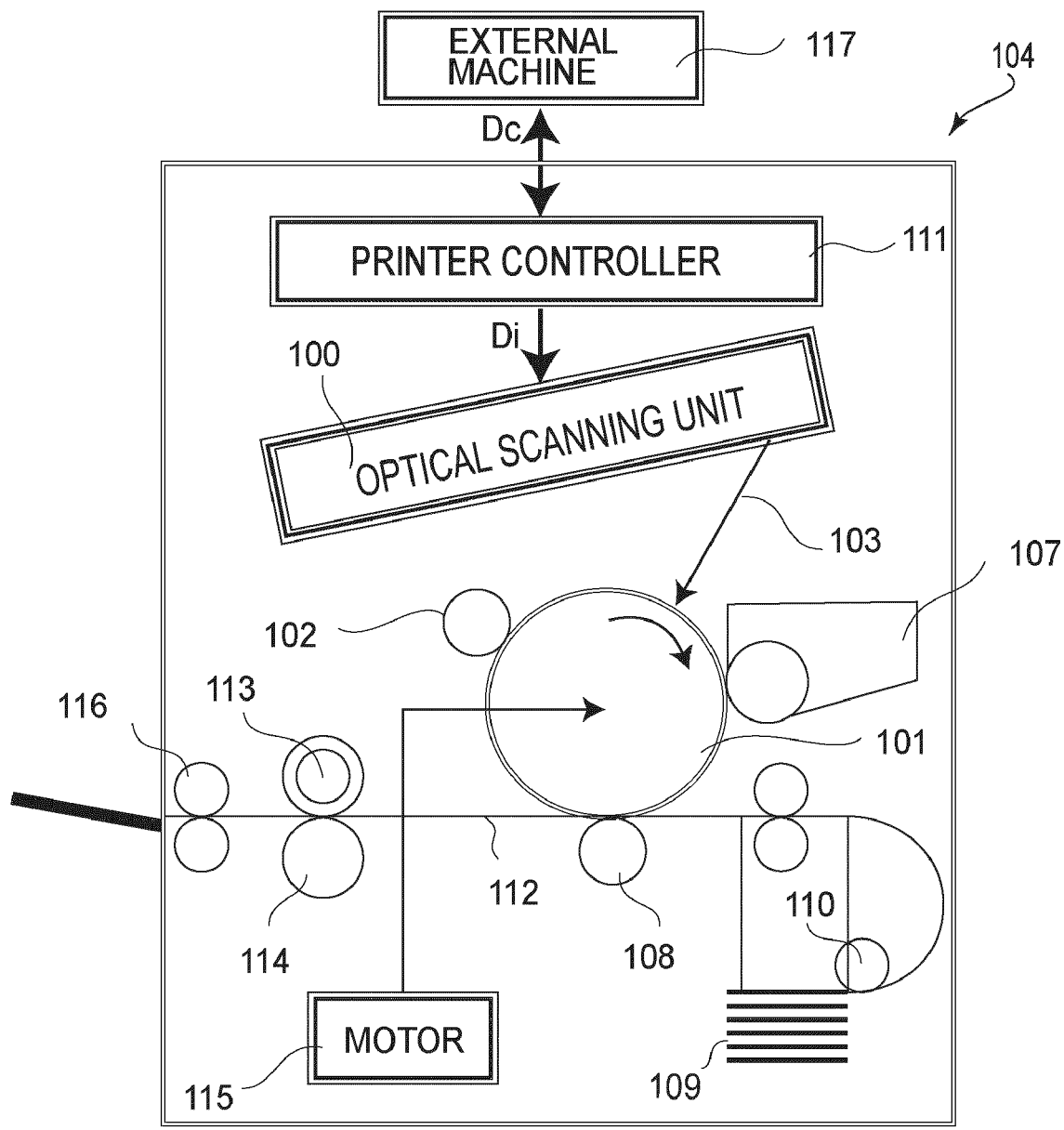
FIG. 9 is a sectional view along the sub-scan section, showing an embodiment of an image forming apparatus according to the present invention.

FIG. 9 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 9) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 9) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 9, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 10:
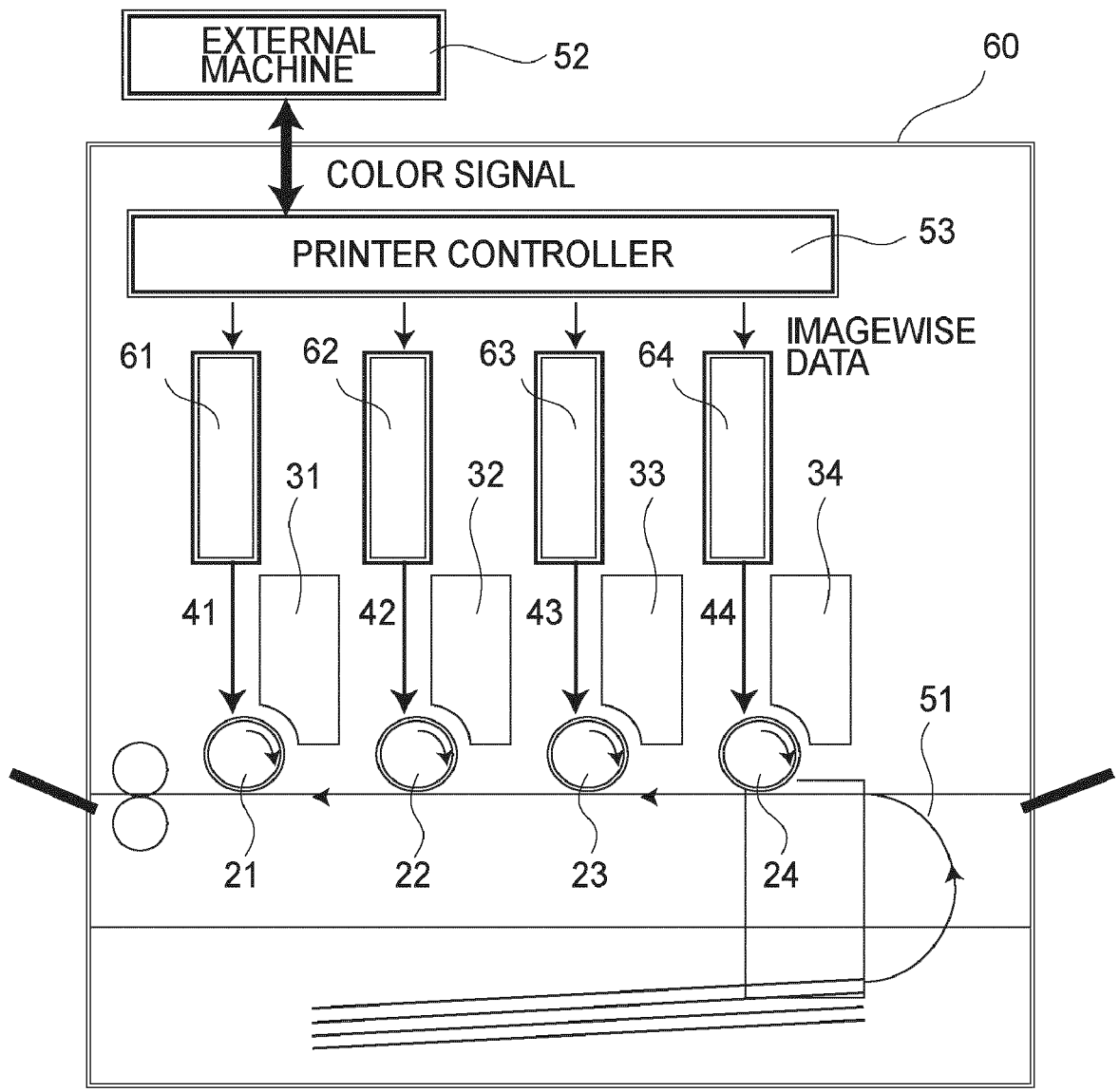
FIG. 10 is a schematic diagram of a main portion of a color image forming apparatus according to an embodiment of the present invention.
Figure 11:
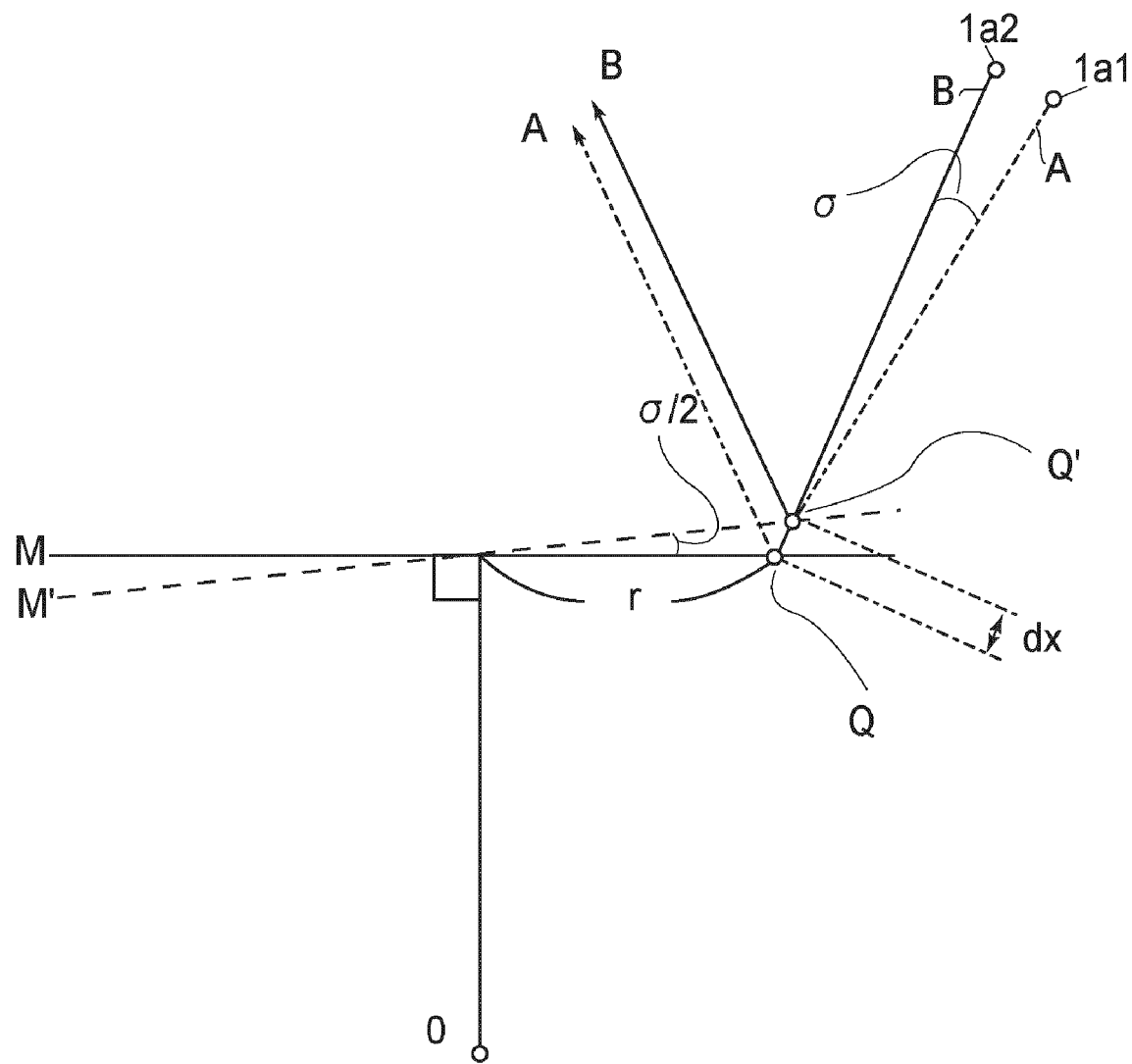
FIG. 11 is a schematic diagram for explaining the principle of multiple-beam pitch unevenness.

FIG. 10 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 10, denoted generally at 60 is a color image forming apparatus, and denoted at 61, 62, 63 and 64 are optical scanning devices having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

Although not shown in FIG. 10, the image forming apparatus further comprises a transfer device for transferring the toner image developed by the developing device to a transfer material, and a fixing device for fixing the transferred toner image on the transfer sheet.

In FIG. 10, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 11, 12, 13 and 14, respectively. In response, these optical scanning devices produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning devices 11, 12, 13 and 14 are provided and these correspond to colors of C (cyan), M (magenta), Y (yellow) and B (black), respectively. These scanning devices are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning devices 11, 12, 13 and 14 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-000870 filed Jan. 6, 2007, for which is hereby incorporated by reference.

What is claimed is:

1. An optical scanning device, comprising:
a light source device having at least two light emitting members disposed spaced apart from each other in a main-scan direction;
a rotary polygonal mirror configured to scanningly deflect at least two light beams emitted from said light source device;
an input optical system configured to project the at least two light beams from said light source device onto said rotary polygonal mirror so that, within a sub-scan section, the at least two light beams are incident on a deflecting surface of said rotary polygonal mirror in an oblique direction with respect to a normal to the deflecting surface; and
an imaging optical system configured to image, upon a surface to be scanned, the at least two light beams scanningly deflected by the deflecting surface of said rotary polygonal mirror;
wherein said input optical system includes a converting optical element configured to transform a light beam from said light source device into a parallel light beam,
wherein, when a maximum pivot angle of said rotary polygonal mirror for scanning an effective region on the scanned surface is denoted by $\theta_{max}$ [deg], an angle defined in the main-scan section between an optical axis of said input optical system and an optical axis of said imaging optical system is denoted by $2\varnothing$ [deg], a focal length of said converting optical element in the main-scan section is denoted by $f_{col}$ [mm], a spacing between two light emitting members, of the at least two light emitting members, which are most spaced apart from each other in the main-scan direction is denoted by a [mm], a largest one of oblique incidence angles in the sub-scan section of the at least two light beams incident on the deflecting surface of said rotary polygonal mirror is denoted by $\alpha$ [deg], an imaging magnification of said imaging optical system in the sub-scan section is denoted by $\beta s$, an inscribed-circle radius of said rotary polygonal mirror is denoted by R [mm], and a resolution of an image in the sub-scan direction is denoted by DPI [dot/inch], a relation $$\left| \frac{\tan\theta_{max}}{\cos\phi} \times \frac{a}{f_{col}} \times R \times \beta s \times \tan\alpha \times \frac{DPI}{25.4} \right| \leq |0.05|$$

is satisfied, and
wherein the largest angle $\alpha$ [deg] of the oblique incidence angles in the sub-scan section of the at least two light beams incident on the deflecting surface of said rotary polygonal mirror satisfies a relation 2 deg. $\leq \alpha \leq$ 4 deg.

2. An optical scanning device according to claim 1, wherein the maximum pivot angle $\theta_{max}$ [deg] of said rotary polygonal mirror for scanning the effective region on the scanned surface satisfies a relation $$15 \text{ deg.} < \theta_{max} < 25 \text{ deg.}$$

3. An optical scanning device according to claim 1, wherein the focal length $f_{col}$ [mm] of said converting optical element in the main-scan section satisfies a relation $$15 \text{ mm} < f_{col} < 80 \text{ mm.}$$

4. An optical scanning device according to 1, wherein the angle 2ø [deg] defined in the main-scan section between the optical axis of said input optical system and the optical axis of said imaging optical system satisfies a relation $$0 \text{ deg.} \leqq 2\text{ø} \leqq 100 \text{ deg.}$$

5. An optical scanning device according to claim 1, wherein a relation $$0 < a/f_{col} < 0.02$$

is satisfied.

6. An optical scanning device according to claim 1, wherein the imaging magnification βs of said imaging optical system in the sub-scan section satisfies a relation $$0.5 < |\beta s| < 2.0.$$

7. An image forming apparatus, comprising:

an optical scanning device as recited in claim 1;

a photosensitive member disposed at a surface to be scanned;

a developing device for developing an electrostatic latent image formed on said photosensitive member with a light beam scanningly deflected by said optical scanning device, to produce a toner image;

a transferring device for transferring the developed toner image onto a transfer material; and a fixing device for fixing the transferred toner image, on the transfer material.

* * * * *